United States Patent Office 3,466,068
Patented Sept. 9, 1969

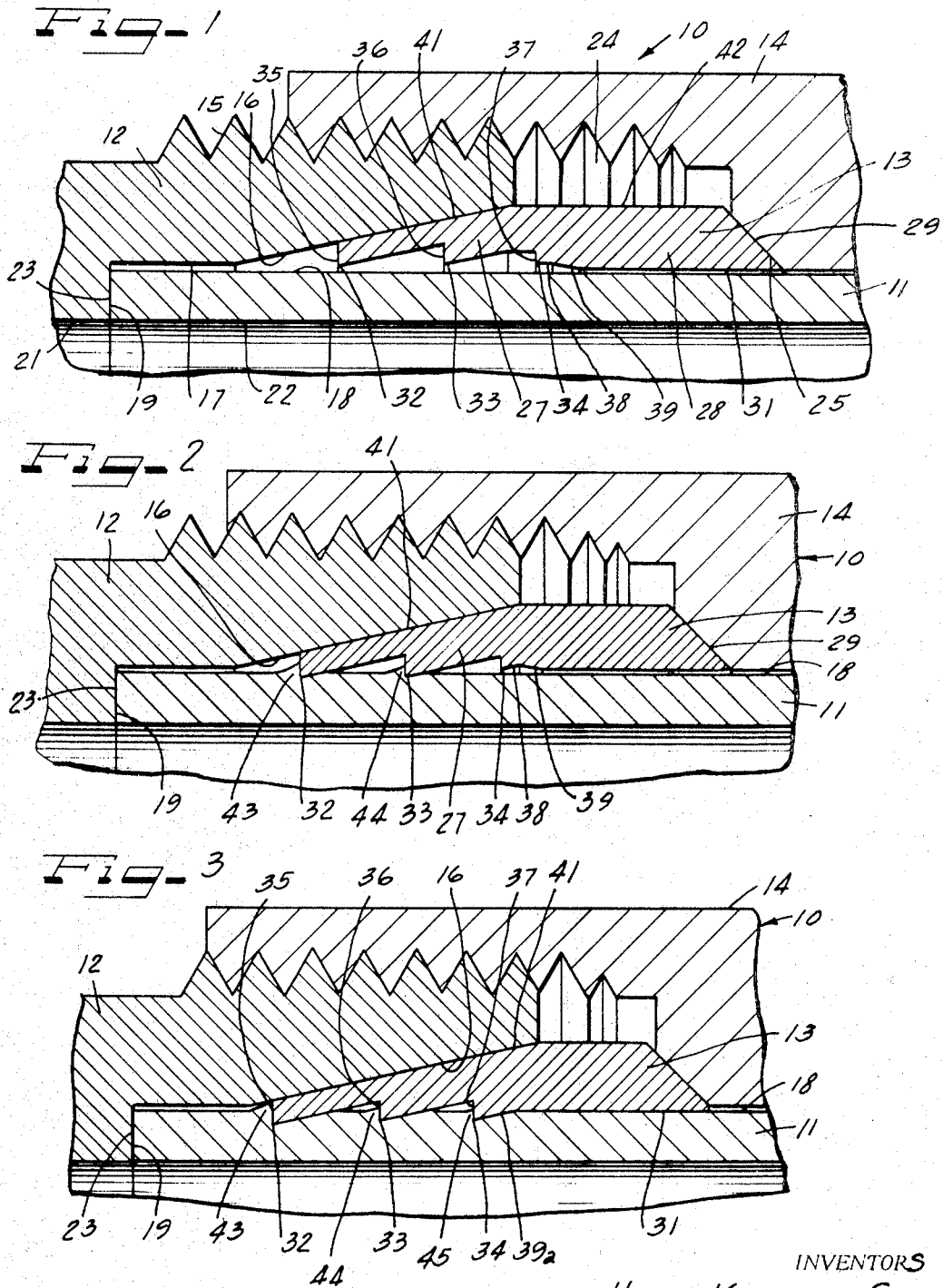

3,466,068
SEALING RING WITH CIRCULAR CUTTING
EDGES FOR PIPE CONNECTION
Hans Kreidel, Sr., and Hans Kreidel, Wiesbaden, Germany, assignors to Inventex G.m.b.H., Baden, Aargau, Switzerland, a corporation of Switzerland
Continuation-in-part of application Ser. No. 552,932, May 25, 1966. This application Mar. 4, 1968, Ser. No. 710,334
Claims priority, application Germany, Apr. 14, 1967, K 62,012
The portion of the term of the patent subsequent to Sept. 24, 1985, has been disclaimed and dedicated to the Public
Int. Cl. F16l 19/06, 19/08, 21/02
U.S. Cl. 285—341          2 Claims

ABSTRACT OF THE DISCLOSURE

A sealing sleeve used in a tube connection by insertion between a connecting nipple and a pressure applying nut. The sleeve has a plurality of circular cutting edges spaced along an inner surface from one end of the sleeve. The inner diameters of the circular cutting edges are progressively increasing as the distance from the one end increases. During the connecting operation, the edges cut into the tube successively and with decreasing penetration depths beginning with the edge adjacent to the one end of the sleeve to provide a firm connection between the tube and the connecting nipple.

CROSS REFERENCE TO RELATED APPLICATIONS

This application is a continuation-in-part of our copending United States patent application, Ser. No. 552,932, entitled "Conical Sealing Rings Having a Circular Edge for Tube Connections," filed May 25, 1966 and now U.S. Patent No. 3,402,948.

BACKGROUND OF THE INVENTION

Field of the invention

This invention pertains to a sealing sleeve particularly one used in connection with a connecting nipple and a pressure applying nut to form a tight seal between the connecting nipple and a tube end.

Prior art

The tightness of the connection between a tube end and a connecting nipple depends on the amount of material which is raised out of the surface of the tube by the cutting edge of the sealing sleeve. In the formation of connections for tubes that will carry fluids under high pressures, the degree of penetration to form a satisfactory joint in many cases is sufficient to deform the tube radially inwardly. Another problem existing in high pressure applications is that the required depth of cutting weakens the tube wall. One solution to the above problem has been the provision of a plurality of cutting edges which simultaneously bite into the outer surface of the tube wall to raise the necessary metal to insure a good seal between the nipple and the tube end. A disadvantage with the provision of a plurality of cutting edges or of a single cutting edge is that the force or torque necessary to be applied by the operator on the pressure applying nut remains substantially constant during the seating of the sealing ring. Thus, the operator is not given any indication when a sufficient amount of penetration by either a single cutting edge or a sleeve using a plurality of cutting edges has been accomplished to provide a satisfactory connection.

In our above-mentioned copending application, we disclosed a sealing ring having a plurality of cutting edges which were of different diameters so that the cutting edge most remote from a leading end of the sealing ring would penetrate and cut into the tube first followed by the next adjacent edge. The sealing ring of the copending application provided for cutting edges which successively cut into the outer surface of the tube so that the force necessary for forming the connection would gradually increase and give an indication to the operator to the actual position of the sealing ring as the connection is being formed. The sealing ring of the above-mentioned copending application is successful; however, it is dependent upon the use of a particular standardized type of pressure applying nut and coupling nipple.

SUMMARY OF THE INVENTION

The present invention provides a sealing sleeve for use in a tube connection in which a sleeve is inserted between a connecting nipple and a pressure applying nut. The sleeve is provided with a plurality of circular cutting edges spaced along an inner surface of the sleeve from the leading end thereof. The diameter of the cutting edges is progressively increasing as the distance of the cutting edge from the leading end is increased so that when pressure is applied to the sleeve, the edge adjacent the leading end begins penetration and is subsequently followed by penetration of the remaining edges with the edge furthest from the leading end making the shallowest penetration. The sleeve is provided with a transmission surface which controls the depth of penetration of the cutting edge furthest from the leading end of the sleeve.

Accordingly it is an object of the present invention to provide a sealing ring which exhibits a tightening limit which is apparent to the assembler.

Another object of the present invention is to provide the sealing ring which creates a tight seal between the connecting nipple and the tube without narrowing or compressing the tube during the connecting operation.

A still further object of the present invention is to provide a sealing ring which creates a tight seal between the tube and connecting nipple without penetrating into the tube beyond a permissable limit.

Yet another object of the present invention is to provide a sealing ring usable with any coupling nipple and pressure applying nut of any standard configuration.

A still further object of the present invention is to provide a sealing sleeve with a plurality of cutting edges which is economical to manufacture.

Many other advantages, features and additional objects of the present invention will become manifest to those versed in the art upon making reference to the detailed description and accompanying sheet of drawings of which a preferred structural embodiment incorporating the principles of the present invention is shown by way of illustrative example.

On the drawings:

FIG. 1 is a fragmental cross section of a tube end connection illustrating a sealing sleeve of the present invention prior to the tightening or coupling operation;

FIG. 2 is a fragmental sectional view of the same tube connection after completion of approximately one-half of the tightening or coupling operation; and FIG. 3 is a fragmental cross sectional view of the same tube connection after completion of the tightening or coupling operation.

As shown on the drawings:

The principles of the present invention are particularly useful when employed in a tube coupling or connector generally indicated at 10 and illustrated in FIG. 1 as being employed on a tube end 11. The tube coupling 10 comprises a coupling or connecting nipple 12, a sealing sleeve 13 and a pressure applying nut 14.

The coupling nipple 12 has a threaded end 15 which has a conical inner surface 16. The inner surface 16 extends into a cylindrical surface 17 which is a diameter larger than the outer surface 18 of the tube 11. The inner surface 17 is terminated by a shoulder 19 which interconnects the surface 17 with an inner surface 21 which has an inner diameter substantially equal to the diameter of the inner surface 22 of the tube 11. When a tube 11 is inserted in the coupling nipple 12, and end surface 23 abuts against the shoulder 19.

The pressure applying nut 14 has an internally threaded counterbore at one end to be received on the threaded end 15 of the coupling nipple 12. When threaded together the nipple 12 and the pressure applying nut 14 form a cavity 24 which receives the sealing sleeve 13. The pressure applying nut 14 is provided with a conical surface 25 at the base of the threaded counterbore.

The sealing ring 13 is an annular member having a leading end portion 27 adjacent one end and a cylindrical portion 28 at the other end. The cylindrical portion 28 may have a conical surface 29 which is complementary to the conical surface 25 of the pressure applying nut 14 and an internal cylindrical surface 31 which is of a diameter slightly larger than the diameter of the outer surface 18 of the tube 11.

The leading end portion 27 is provided with three internal cutting edges 32, 33 and 34. Each of the cutting edges 32, 33 and 34 are provided with a shaving surface 35, 36 and 37 respectively, which are substantially perpendicular to the axis of tube 11 and give the cutting edges 32, 33 and 34 a cross-section of a saw tooth configuration. As illustrated, the cutting edge 32 is defined by the end of the sleeve 13. The cutting edge 33 is spaced inwardly from the edge 32 and the third cutting edge 34 which is the most remote from the one end of the sleeve 13 is spaced inwardly from the edge 33. As best illustrated in FIGURE 1, the cuting edges 32, 33 and 34 are differentially spaced from each other with the distance between the cutting edges 32 and 33 being greater than the distance between the cutting edges 33 and 34. The cutting edge 34 has a rear or back surface 38 which is interconnected to the cylindrical inner surface 31 by a conical transition surface 39. The cutting edges 32, 33 and 34 are of different inner diameters with the edge 32 having the smallest diameter. The diameter of the edge 33 is slightly larger than the diameter of the edge 32 and the edge 34 has a diameter larger than the diameters of the edges 32 and 33.

The leading end portion 27 has a converging outer surface 41 which defines a conical external surface which as illustrated is complementary to the conical inner surface 16 of the connecting nipple 12. It is desirable to have the degree or angle of inclination of the surface 41 less than or shallower than the degree of inclination of the surface 16 so that the first portion of the surface 41 to contact the conical surface 16 would be adjacent the cutting edge 32. The sealing sleeve 13 has a remaining outer surface 42 which is cylindrical and extends between the conical surface 41 and the conical surface 29.

In forming a connection between the tube 11 and the connecting unit 10, the pressure applying nut 14 is threaded onto the connecting nipple 12 and applies a force to the conical surface 29 to axially move the sleeve 13 with respect to the nipple 12. The axial movement or shifting of the sleeve 13 causes the engagement of conical surface 41 with the inner conical surface 16 of the connecting nipple 12 which in turn causes a radial contraction of the leading end portion 27. When the portion 27 is contracted, the circular cutting edge 32 begins to bite into the outer surfaces 18 of the tube 11 and carry tube 11 with the sleeve 13. As the tube end surface 23 abuts against the internal shoulder 19 of the connecting nipple 12, the cutting edge 32 will begin its penetration as shown in FIG. 2.

The leading end portion 27 is contracted so that the cutting edge 32 first bites into the tube and is successively followed by the cutting edge 33. The coaction of the cutting edges and their shaving surfaces cause the material of the outer tube surface 18 to be raised into ridges such as the ridges 43 and 44 respectively. The movement of the sealing sleeve 13 toward the connecting nipple 12 causes the conical outer space 41 of the sleeve to be enlarged as a portion of the outer cylindrical surface 42 adjacent to the conical surface portion 41 is upset and deformed into a conical surface.

As illustrated in FIG. 3, at the completion of the connecting operation, the sleeve 13 has been contracted so that the cutting edges 32, 33 and 34 each penetrated the outer surface 18 of the tube 11 with decreasing depths of penetration starting with the cutting edge 32. The ridges 43 and 44 have increased in height while the cutting edge 34 is dug into the surface 18 to form a ridge 45. The shaving surfaces 35, 36 and 37 have radial widths which are progressively decreasing from the shaving surface 35 to the surface 37 and tightly abut against their respective ridges 43, 44 and 45 to maintain the tube end surface 23 in tight engagement with the internal shoulder 19 of the coupling nipple.

The axial displacement of the sleeve 13 with respect to the nipple 12 causes the leading end portion 27 to be deformed or contracted inwardly. As illustrated the deformation includes the enlarging of the conical surface 41 at the expense of the cylindrical outer surface 42. It should also be noted that the deformation of the sleeve adjacent to the most remote cutting edge 34 has caused the transition surface 39 to be deformed downward to merge with the back or rear surface 38 to form a deformed transition surface 39a which tightly engages the tube 11. This engagement of the deformed transition surface 39a limits the depth penetration of the cutting edge 34. The coaction between the conical surface 16 of the coupling nipple and the surface 25 of the pressure applying nut 14 have upset the cylindrical portion 28 of the sleeve 13 so that the inner surface 31 of cylindrical portion 28 is in engagement with the outer tube surface 18 at the completion of the connecting operation.

As is apparent in the FIGURES 2 and 3, as the pressure applying nut 14 is threaded onto the coupling nipple 12, the cutting edges 32, 33 and 34 cut into the surface 18 of the tube 11 successively. This successive cutting into the tube surface causes the force necessary for threading the nut 14 onto the nipple 12 to be gradually increased until the maximum force is generated when all of the cutting edges 32, 33 and 34 are in engagement with the tube 11. When the transition surface 39 has been deformed along with the back or rear surface 38 to form the deformed surface 39a, the force necessary for continuing the threading of the nut 14 has reached a maximum which is detectable to the person making the connection and gives an indication that the connection is completed.

It is noted that like similar connections of the prior art, the pressure applying nut 14 can be unthreaded from the nipple 12 to allow inspection of the sleeve which will be partially embedded in the tube surface. Thus, once the connection is made it can be disconnected to allow inspection of the tubing 11.

If the degree of inclination of the conical surface 41 of the sleeve 13 is shallower or less than the degree of inclination of the conical surface 16 of the nipple 12, the leading end portion 27 will be progressively deformed and contracted inwardly starting adjacent the circular cutting edge 32 at the one end. Thus, by providing the conical surface 41 with a shallower degree of inclination, the sleeve 13 may be used with coupling nipples such as 12 which have an inner concial surface 16 with a slight variation in the degree of inclination. The only limitation being that the degree of inclination of the surface 41 should be equal to or less than the shallowest inclination or angle of the surface 16 for the coupling nipple 12.

Although various minor modifications might be suggested by those versed in the art, it should be understood that we wish to employ within the scope of the patent warranted hereon, all such embodiments as reasonably and properly come within the scope of our contribution to the art.

We claim:

1. A sealing sleeve for use in a tube connection comprising a connecting nipple having an internal shoulder for receiving an end of a tube and a conical inner surface adjacent the shoulder for receiving one end of the sealing sleeve disposed about the outer surface of the tube between the nipple and a pressure applying nut connected to the nipple and engaging said sleeve, said sleeve comprising an annular member having a leading end portion at said one end and a cylindrical portion at the other end, said leading end portion having an outer surface converging toward said one end to define a conical surface with a degree of inclination at least as small as the degree of inclination of the conical surface of the nipple, said leading end having a plurality of differentially spaced circular cutting edges with corresponding shaving surfaces disposed on an inner surface thereof, said cutting edges beginning adjacent said one end having progressively larger inner diameters, said cylindrical portion having a cylindrical inner surface of a diameter smaller than the diameter of the said cutting edges and terminating adjacent the cutting edge most remote from said one end in a conical transition surface extending between said cylindrical surface and the back surface of the most remote cutting edge, said conical transition surface being reformed into engagement with the outer surface of the tube during formation of a connection so that when said sleeve member is thrust axially by the pressure applying nut into said connecting nipple to effect the connection between said nipple and said tube, said leading end portion is compressed and deformed by said conical surface of the nipple to cause said cutting edges beginning adjacent said one end to sequentially cut into the outer surface of the tube with decreasing penetration to raise decreasing amounts of the material of the tube with the penetration of the most remote cutting edge being limited by the engagement of the reformed transition surface on the outer surface of the tube.

2. A sealing sleeve according to claim 1, wherein said shaving surfaces beginning adjacent said one end and extending to the most remote shaving surface have progressively smaller radial widths.

References Cited

UNITED STATES PATENTS

| 2,553,619 | 5/1951 | Woodling | 285—382.7 X |
| 2,695,796 | 11/1954 | Woodling | 285—382.7 X |
| 3,120,969 | 2/1964 | Schmohl | 285—382.7 X |

FOREIGN PATENTS

| 834,626 | 3/1962 | Germany. |
| 1,168,715 | 4/1964 | Germany. |
| 675,082 | 7/1952 | Great Britain. |

THOMAS F. CALLAGHAN, Primary Examiner

U.S. Cl. X.R.

285—382.7